UNITED STATES PATENT OFFICE.

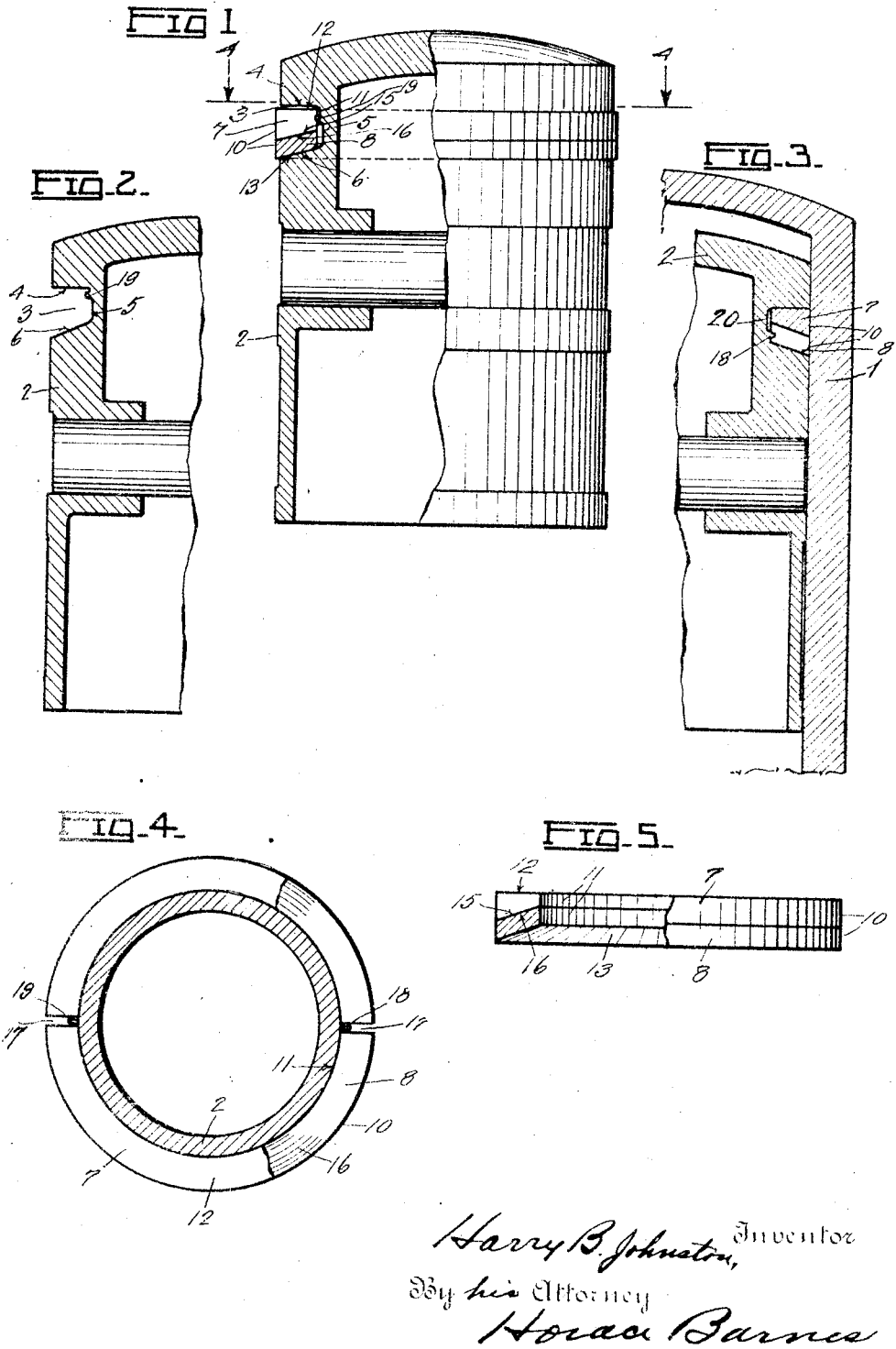

HARRY B. JOHNSTON, OF SEATTLE, WASHINGTON.

PISTON AND PISTON-RING.

1,330,189.

Specification of Letters Patent.   Patented Feb. 10, 1920.

Application filed October 27, 1919.   Serial No. 333,704.

*To all whom it may concern:*

Be it known that I, HARRY B. JOHNSTON, a citizen of the United States, residing at Seattle, in the county of King and State of Washington, have invented certain new and useful Improvements in Pistons and Piston-Rings, of which the following is a specification.

This invention relates to improvements in pistons for steam or internal combustion engines, and to the metallic piston rings therefor.

The object of the invention is the provision of a piston having a single groove in which a pair of piston rings are retained of special and novel construction, whereby the gas or steam pressure within the cylinder will act thereon to cause the rings to expand against the cylinder walls, the rings being designed to coact relatively to divide the expansive effect exerted thereon so that no excessive or binding action upon the cylinder walls will result.

The invention consists in the novel construction, adaptation and combination of a piston and the rings therefor, as will be fully described in the following specification, illustrated in the accompanying drawings, and finally set forth in the appended claims.

In said drawings, Figure 1 is a view in elevation of a piston and rings therefor constructed in accordance with my invention, shown partly in section. Fig. 2 is a fragmentary sectional view of a piston showing the ring-groove without the rings. Fig. 3 is a fragmentary sectional view of a piston embodying my invention contained within a cylinder. Fig. 4 is a view in horizontal section on line 4—4 of Fig. 1, the upper ring being broken away. Fig. 5 is a view in elevation, partly in section, of a pair of rings shown detached.

Referring to said views, the reference numeral 1 indicates the engine cylinder and 2 a piston operatively mounted therein. Said piston is formed in proximity of its upper end with an annular ring-groove 3 whose upper wall 4 is substantially at right angles with the vertical exterior wall of the piston and with the rear wall 5 of the groove. The bottom wall 6 of the groove is inclined upwardly and inwardly from the exterior wall of the piston at an angle approximating twenty degrees.

Coöperating in said groove are two packing rings 7 and 8. Both said rings are formed with vertical and parallel outer and inner faces 10 and 11, respectively, while the upper ring 7 is formed with an upper face 12 parallel with the upper wall 4 of the groove 3.

The lower ring 8 is formed with an inclined under face 13 corresponding in angularity with the lower wall 6 of the groove. The lower face 15 of the upper ring 7 and the upper face 16 of the lower ring are inclined correspondingly from their vertical faces and substantially similarly to the angularity of the lower wall 6 of the groove, but this similarity of inclination as between the lower and upper faces of rings 7 and 8 on the one hand and the wall 6 on the other, may be departed from to some extent.

The rings are provided with a relatively large cut or opening at 17 and the piston groove is formed or provided with pins 18 and 19 arranged upon diametrically opposite sides of the piston and at elevations, respectively, so that one of said pins, as 18, will protrude within the cut 17 of the ring 8 and the other pin 19 will protrude within the cut of the ring 7 and thus maintain said cuts at opposite sides of the piston so as to insure that said cuts will never coincide and thus permit leakage of gas.

The depths of said rings are less than that of the groove so that when the rings are in their operative positions within the cylinder, as indicated in Fig. 3, there will remain a clearance space 20 at the rear of the groove.

In operation, when the piston and rings are mounted in operative condition within a cylinder and the pressure of gas within the combustion chamber exerts its force upon the piston, a portion of such force will be expended upon the piston rings in a downward direction. The effect of the pressure will be such that the upper ring 7 will react upon the upper inclined face 16 of the lower ring and be forced outwardly into intimate contact with the cylinder walls on its downward stroke and be relieved to some extent on its upward stroke.

The lower ring will also have a tendency to follow this same movement, although to less extent due to its response to downward pressure having a reactionary effect outward on inclined wall 6 of the groove. The lower ring 8, however, serves especially as a bearing for the upper ring 7 and when the rings become worn from continued use the lower ring will serve as a bearing and inclined support for the upper ring, the wear being compensated for by the movement of the lower ring outward as its vertical face 10 is worn away.

Having described my invention, what I claim, is—

1. A piston having an annular ring groove whose top wall is at right angles to the vertical side wall of the piston and whose lower opposite wall is inclined upwardly and inwardly from said vertical wall, a piston ring in said groove having its lower and upper faces parallel and inclined correspondingly to the lower wall of said groove, and another piston ring superimposed upon said first-named ring having its lower face inclined to correspond with the upper face of said first-named ring.

2. A piston having a working face and an annular ring groove whose wall farthest away from the working face of the piston is inclined upwardly toward the working face of the piston and inwardly from the cylindrical surface thereof, a piston ring in said groove having its lower and upper faces substantially parallel and its face farthest from the working face inclined correspondingly to the adjacent wall of the groove, and another piston ring superimposed upon said first named ring having its face farthest from the working face inclined to correspond with the adjacent face of the first named ring and having its face nearest the working face, lying substantially in a plane.

3. A piston having a working face and an annular ring groove whose wall farthest away from the working face of the piston is inclined upwardly toward the working face of the piston and inwardly from the cylindrical surface thereof, a piston ring in said groove having its lower and upper faces substantially parallel and its face farthest from the working face inclined correspondingly to the adjacent wall of the groove, and another piston ring superimposed upon said first named ring and having its face farthest from the working face inclined to correspond with the adjacent face of the first named ring and having its opposite face diverging outwardly with relation to its first mentioned face.

Seattle, Washington, October 21st, 1919.

HARRY B. JOHNSTON.